United States Patent
Lenzi et al.

(10) Patent No.: US 11,565,509 B2
(45) Date of Patent: Jan. 31, 2023

(54) COMPOSITE MATERIALS WITH STRUCTURAL AND FIRE RETARDANT CAPABILITIES

(71) Applicant: Cytec Industries Inc., Princeton, NJ (US)

(72) Inventors: Fiorenzo Lenzi, Vitulazio (IT); Carmelo Luca Restuccia, Chester (GB)

(73) Assignee: Cytec Industries Inc., Princeton, NJ (US)

( * ) Notice: Subject to any disclaimer, the term of this patent is extended or adjusted under 35 U.S.C. 154(b) by 756 days.

(21) Appl. No.: 15/912,717

(22) Filed: Mar. 6, 2018

(65) Prior Publication Data

US 2018/0257350 A1    Sep. 13, 2018

Related U.S. Application Data

(60) Provisional application No. 62/467,885, filed on Mar. 7, 2017.

(51) Int. Cl.

| | |
|---|---|
| *C08K 5/3492* | (2006.01) |
| *C08K 5/00* | (2006.01) |
| *C08K 5/521* | (2006.01) |
| *C08J 5/24* | (2006.01) |
| *B32B 27/28* | (2006.01) |
| *B32B 27/38* | (2006.01) |
| *B32B 5/26* | (2006.01) |
| *B32B 27/30* | (2006.01) |
| *B32B 27/42* | (2006.01) |
| *B32B 5/02* | (2006.01) |
| *B32B 5/08* | (2006.01) |
| *C08J 5/10* | (2006.01) |
| *B32B 27/12* | (2006.01) |
| *B32B 27/26* | (2006.01) |
| *C08J 5/04* | (2006.01) |
| *C08K 3/04* | (2006.01) |
| *B32B 27/34* | (2006.01) |

(52) U.S. Cl.
CPC ............ *B32B 27/286* (2013.01); *B32B 5/022* (2013.01); *B32B 5/024* (2013.01); *B32B 5/08* (2013.01); *B32B 5/26* (2013.01); *B32B 27/12* (2013.01); *B32B 27/26* (2013.01); *B32B 27/281* (2013.01); *B32B 27/306* (2013.01); *B32B 27/308* (2013.01); *B32B 27/38* (2013.01); *B32B 27/42* (2013.01); *C08J 5/04* (2013.01); *C08J 5/10* (2013.01); *C08J 5/243* (2021.05); *C08J 5/249* (2021.05); *C08K 5/0066* (2013.01); *C08K 5/34922* (2013.01); *C08K 5/521* (2013.01); *B32B 27/34* (2013.01); *B32B 2250/02* (2013.01); *B32B 2250/03* (2013.01); *B32B 2250/05* (2013.01); *B32B 2250/20* (2013.01); *B32B 2250/242* (2013.01); *B32B 2255/02* (2013.01); *B32B 2255/26* (2013.01); *B32B 2260/021* (2013.01); *B32B 2260/046* (2013.01); *B32B 2262/0246* (2013.01); *B32B 2262/0253* (2013.01); *B32B 2262/0269* (2013.01); *B32B 2262/101* (2013.01); *B32B 2262/106* (2013.01); *B32B 2262/14* (2013.01); *B32B 2264/0214* (2013.01); *B32B 2264/104* (2013.01); *B32B 2264/12* (2013.01); *B32B 2307/3065* (2013.01); *B32B 2307/50* (2013.01); *B32B 2307/558* (2013.01); *B32B 2605/18* (2013.01); *C08J 2300/22* (2013.01); *C08J 2363/00* (2013.01); *C08K 3/04* (2013.01); *C08L 2201/02* (2013.01)

(58) Field of Classification Search
None
See application file for complete search history.

(56) References Cited

U.S. PATENT DOCUMENTS

| | | | |
|---|---|---|---|
| 2005/0256234 A1* | 11/2005 | Kurumatani | ............. C08K 3/22 524/115 |
| 2012/0164373 A1* | 6/2012 | Spencer | ............ C08G 59/1488 428/116 |
| 2012/0164455 A1* | 6/2012 | Griffin | ........................ C08J 5/24 428/413 |
| 2014/0170408 A1 | 6/2014 | Frulloni et al. | |
| 2015/0166743 A1 | 6/2015 | Restuccia et al. | |
| 2015/0337183 A1 | 11/2015 | Pratte et al. | |
| 2015/0344686 A1* | 12/2015 | Shimizu | ..................... C08J 5/24 523/468 |
| 2016/0082691 A1 | 3/2016 | Restuccia et al. | |
| 2017/0043552 A1* | 2/2017 | Lenzi | .................... B29C 70/025 |

FOREIGN PATENT DOCUMENTS

GB        2472423 A        2/2011

* cited by examiner

*Primary Examiner* — Tanisha Diggs
(74) *Attorney, Agent, or Firm* — Thi Dang (57) ABSTRACT

A composite material having at least two layers of reinforcing fibers impregnated with a curable resin; an interlaminar region formed between adjacent layers of reinforcing fibers; and a combination of polymeric toughening particles and fire-retardant particles in the interlaminar region.

19 Claims, 1 Drawing Sheet

COMPOSITE MATERIALS WITH STRUCTURAL AND FIRE RETARDANT CAPABILITIES

The instant application claims the benefit of prior U.S. Provisional Application No. 62/467,885 filed on Mar. 7, 2017, which is incorporated herein by reference.

The present disclosure generally relates to fiber-reinforced resin composite materials and applications of thereof.

DETAILED DESCRIPTION

Fire is a major safety hazard for commercial aircrafts. In-flight fire has been ranked as one of the highest known contributing causes of fatalities arising from accidents involving commercial jet aircrafts. All non-metallic materials used inside the pressure vessel of commercial aircrafts are subject to flammability regulations in many countries. In recent years, some aircraft parts such as fuselage and wings are manufactured from composite materials composed of reinforcement fibers embedded in a polymer matrix. The heat, smoke and gases released by a burning composite structure and its degradation of the structural integrity can quickly jeopardize the safety of an aircraft in case of a fire accident.

In many countries, regulations and requirements for testing aircraft interior parts and materials are established. For example, the Federal Aviation Administration (FAA) in the United States set out such requirements in FAR Section 25.853, which are applicable for composite parts, especially fuselage cabin of aircrafts. Similar requirements are set in Europe by the EUROPEAN AVIATION SAFETY AGENCY (EASA).

One requirement is that the material should be able to self-extinguish within predetermined seconds once the flame source is removed from its application to a composite material.

Another requirement is that the combustion of a material should not generate high levels of smoke and toxic gasses. The level of smoke and toxic gasses may be measured by means of a combustion test of composite coupons. One of the common tests for creating "smoke" is the ASTM E662 Smoke Chamber which includes exposing composite coupons to an external radiant heat flux of 25 kW/m$^2$ in a closed chamber. Another industry standard test is Boeing Specification Support Standard, BSS 7239 ("Test Method for Toxic Gas Generation by Materials of Combustion") which requires analysis of combustion gases and has specified concentration limits on toxic gases which currently include hydrogen cyanide (HCN), nitrogen oxides (NO$_x$), carbon monoxide (CO), hydrogen chloride (HCl), hydrogen fluoride (HF), and sulfur dioxide (SO$_2$).

Although the requirements above are not specifically applicable to composite materials for aircraft primary structures, to mitigate the risks due to a fire scenario and to improve the passenger's escape time, composite materials that can self-extinguish quickly while producing negligible amounts of smoke, toxic gases and released fibers are desirable.

It is also highly desirable that composite materials used in aircraft structures, mainly in fuselage skin, can provide improved burn-through protection as compared to state-of-art composite materials. This could be achieved by a composite material with improved resistance to fire penetration in case of a post-crash fire.

The flammability performance of composite materials can be improved by incorporating different type of materials, such as inorganic additives, in the matrix resin used for the manufacturing of the fiber-reinforced polymer composite. For example, ceramic microspheres, hydrated alkali metal silicates, aluminium trihydrate (ATH), metal oxides such as Aluminium hydroxide Al(OH)$_3$, Magnesium Hydroxide (MDH) and zinc borate may be added at high loadings to provide a composite with fire self-extinguishing properties or reduced smoke generation when exposed to fire, but such addition leads to significant weight gain and reduction in impact resistance-related properties such as Compression Strength After Impact (CAI) and fracture toughness in mode I and II ($G_{Ic}$ and $G_{IIc}$).

As such, the state-of-the art solutions are such that the flammability of a fiber-reinforced polymer composite can be improved but not, simultaneously, its mechanical performance. A cured composite (e.g., a prepreg layup) with improved impact performance is one with improved CAI and fracture toughness ($G_{Ic}$ and $G_{IIc}$). CAI measures the ability of a composite material to tolerate damage. In the test for measuring CAI, the cured composite is subjected to an impact of a given energy and then loaded in compression. The damage area and the dent depth are measured following the impact and prior to the compression test. During this test, the composite is constrained to ensure that no elastic instability is taking place and the strength of the composite is recorded.

Fracture toughness is a property which describes the ability of a material containing a crack to resist fracture, and is one of the most important properties of a material for aerospace applications. Fracture toughness is a quantitative way of expressing a material's resistance to brittle fracture when a crack is present.

Fracture toughness may be quantified as strain energy release rate ($G_c$), which is the energy dissipated during fracture per unit of newly created fracture surface area. $G_c$ includes $G_{Ic}$ (Mode 1—opening mode) or $G_{IIc}$ (Mode II—in plane shear). The subscript "Ic" denotes Mode I crack opening, which is formed under a normal tensile stress perpendicular to the crack, and the subscript "IIc" denotes Mode II crack produced by a shear stress acting parallel to the plane of the crack and perpendicular to the crack front. The initiation and growth of a delamination is often determined by examining Mode I and Mode II fracture toughness.

Conventional high-performance composite materials with high impact performance and fracture toughness typically contain polyether sulfone (PES) or other sulfur-containing thermoplastic toughening materials that could release high SO$_2$ emission levels. The SO$_2$ emission level is determined by measuring the amount of SO$_2$ in parts per million (ppm) that is released by a composite sample during combustion under specified thermal exposure conditions in the National Bureau Standard (NBS) Smoke Density Chamber according to ASTM E662. Some composites may contains PES-based toughening particles at the interlaminar regions in addition to resin matrix toughened with PES and such particles would further increase the level of SO$_2$ emission to an unacceptable level.

Moreover, high-performance composite materials have interlaminar particles, such as Nylon, which are known by those skilled in the art to have low self-extinguish performance.

Therefore, it would be desirable to provide composite materials that will produce low levels of $SO_2$ emission, that can self-extinguish quickly and have good resistance to fire penetration in case of an in-flight fire scenario or a burn-through fire scenario caused by a post-crash aircraft accident. Moreover, there remains a need in the aerospace industry to have a multifunctional composite material that can also simultaneously provide impact performance and toughness required for load bearing applications.

It has been found that a combination of polymeric toughening particles and insoluble fire-retardant particles in the interlaminar regions of a composite laminate can simultaneously improve the flame resistance, impact performance and toughness as comparing to the same composite laminate containing just one of the two types of particles. In this context, "insoluble" particles remain as discreet particles in the interlaminar regions of the composite laminate during the curing thereof, i.e., the particles do not dissolve into the surrounding resin matrix during curing.

In some embodiments, it has been discovered that the combination of polymeric toughening particles and certain insoluble fire-retardant particles at the interlaminar region can produce a synergistic effect that includes a reduction in the self-extinguishing time and reduction in smoke emission, and simultaneously, an improvement in CAI and $G_{Ic}$.

One aspect of the present disclosure is directed to a curable composite material comprising:
a) at least two layers of reinforcing fibers impregnated with or embedded in a curable resin;
b) an interlaminar region between adjacent layers of reinforcing fibers; and
c) a combination of polymeric toughening particles (P1) and insoluble fire retardant particles (P2) in the interlaminar region.

The interlaminar region also contains a curable resin and the particles are substantially embedded in this resin. The curable resin in the interlaminar region may be the same or different from the curable resin impregnating the reinforcing fibers. The term "substantially embedded" means at least 90 wt. % of the particles are embedded in the resin in the interlaminar region.

The particles may be spherical or non-spherical, porous or not porous. As used herein, the term "particles" refers to discrete three dimensional shaped structures which are distinct, individual units that are separate from each other, but such separation does not preclude the structures from being in contact with one another.

The polymeric toughening particles (P1) and the fire retardant particles (P2) are dispersed in the interlaminar region at a total content of 5% to 40% by weight based on the weight of the total resin content in the composite material. In some embodiments, the total content of both P1 and P2 particles is between 10% and 20% by weight based on the weight of the total resin content in the composite material.

The weight ratio of polymeric toughening particles to fire-retardant particles (P1:P2) may be in the range of from 1:3 to 2:1 weight/weight.

The polymeric toughening particles that are suitable for the purposes herein include thermoplastic particles. Each particle may have or may not have a conductive outer coating such as metal. The toughening particles may be soluble or insoluble in the thermoset matrix resin of the composite material during curing thereof. Insoluble particles remain as discreet particles in the cured polymer matrix after curing, while soluble particles dissolve into the surrounding resin upon curing the resin. Determining whether certain particles are insoluble or soluble relates to the solubility of the particles in a particular resin system in which they reside. The resin system may include one or more thermoset resins, curing agents and/or catalysts, and minor amounts of optional additives for modifying the properties of the uncured resin or cured polymer matrix.

The polymeric toughening particles may also include swellable particles, which swell or increase in volume in the thermoset resin of the composite material during curing.

The polymeric toughening particles may be particles of thermoplastic polymers selected from: polyimide, polyamideimide (PAI), polyamide (PA/Nylon), polyphthalamide, polyetherketone. polyetheretherketone, polyetherketoneketone, polyaryletherketones, polyphenylenesulfide, liquid crystal polymers, cross-linked polybutadiene, polyacrylic, polyacrylonitrile, polystyrene, polyetherimide (PEI), polyamide, polyimide, polysulfone, polyethersulfone (PES), poly phenylene oxide (PPO), poly ether ketones, polyaryletherketones (PAEK) such as polyetheretherketone (PEEK) and polyetherketoneketone (PEKK), polyphenyl sulfides (PPS), polyhydroxyethers, styrene-butadiene, polyacrylates, polyacetol, polybutyleneterephthalate, polyamide-imide, polyetherethersulfone (PEES), blends thereof, or copolymers thereof.

The polymeric toughening particles may also be cross-linked thermoplastic particles of the type disclosed in the published U.S. Patent Application with Pub. No. US 2010/0304118 and U.S. Pat. No. 8,846,818, both of which are incorporated herein by reference. In some embodiments, the cross-linked thermoplastic particles are particles of cross-linked PES-PEES copolymer.

The polymeric toughening particles may have a mean particle size (d50) in the range of 5 to 50 microns (μm) as measured by a laser diffraction technique, for example, using Malvern Mastersizer 2000, which operates in the 0.002 nanometer to 2000 micron range. "d50" represents the median of the particle size distribution, or alternatively is the value on the distribution such that 50% of the particles have a particle size of this value or less.

Preferably the polymeric toughening particles are substantially spherical in shape with an aspect ratio of approximately 1:1. With reference to toughening particles, the term "aspect ratio" refers to the ratio of the largest cross sectional dimension of the particle to the smallest cross sectional dimension of the particle.

The fire retardant particles contain a fire retardant compound such as a phosphorous compound, preferably at a content of at least 14% by weight, or at least 18% by weight. In some embodiments, the fire retardant particles contain nitrogen and phosphorous compound. In other embodiments, the fire retardant particles contain nitrogen, phosphorous compound and melamine. Preferably, the fire retardant particles are not soluble in thermoset resins such as epoxy up to 200° C.

As examples, the fire retardant particles may be selected from: ammonium polyphosphate, melamine cyanurate, melamine phosphate, melamine polyphosphate and melamine poly(metal phosphates). Examples of melamine poly(metal phosphates) are melamine-poly (zinc phosphate) and melamine-poly (aluminium phosphate).

The fire retardant particles may have a mean particle size (d50) from 2 to 35 microns, and in some embodiments, 5 to 20 microns.

Figure 1:
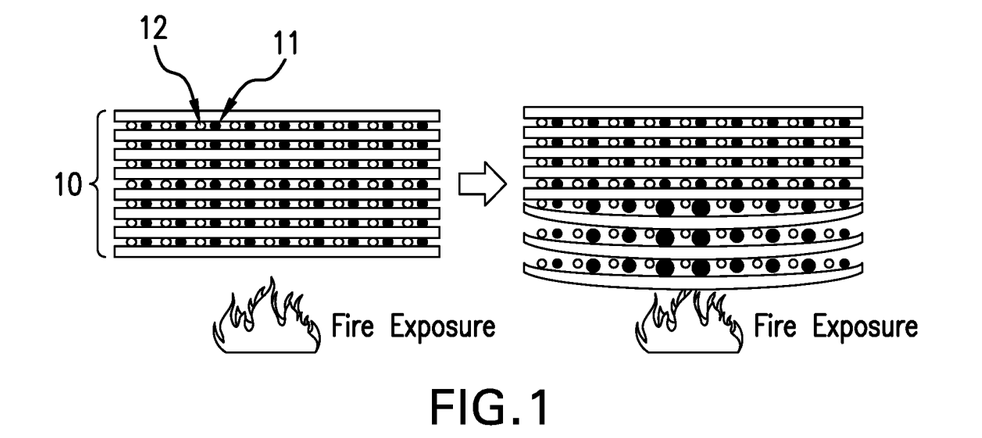
FIG. 1 schematically illustrates the behavior of a composite laminate under fire exposure according to an embodiment of the present disclosure.

In one embodiment, the fire retardant particles are thermally expandable or intumescent fire retardant particles that will expand when exposed to high temperature, for example, between 200° C. and 600° C., and flame, and have low solubility in water and other organic liquids. FIG. 1 schematically illustrates the behavior of a composite laminate (or prepreg layup) 10 having a combination of thermally expandable fire-retardant particles 11 and polymeric toughening particles 12 in the interlaminar regions when the laminate is exposed to fire. In FIG. 1, the left-side figure shows the laminate 10 at the initial exposure to fire and the right-side figure shows the same laminate with expansion of fire-retardant particles near the exposed surface after a period of fire exposure.

According to one embodiment, the fire retardant particles are ammonium polyphosphate particles encapsulated within a melamine or melamine-containing resin. This type of fire retardant particles may be combined with polymeric toughening particles selected from particles of polyamide, aromatic polyimide, and crosslinked PES-PEES. The aromatic polyimide may be any polymer of which more than 50% (in weight) of the recurring units comprise at least one aromatic ring and at least one imide group. The melamine tends to expand when exposed to high temperature, for example above 200° C., and flame.

In another embodiment, a combination of melamine-encapsulated ammonium polyphosphate particles and conductive polyimide particles is used. The conductive polyimide particles are formed from a blend of polyimide and a minor amount (<50% in weight) of conductive material such as graphite.

Exemplary commercially available fire retardant particles are ammonium polyphosphate particles from CLARIANT under the product names Exolit AP 462 and Exolit AP 740 F. Exolit AP 462 is a fine-particle white powder having a particle size (d50) of about 20 microns, composed of particles of ammonium polyphosphate micro-encapsulated (i.e., coated) with melamine resin, is non-hygroscopic and non-flammable. Exolit AP 740 F is a fine-particle white powder having a size (d50) of 8-12 microns, based on ammonium polyphosphate which develops its effectiveness through phosphorus/nitrogen synergism and intumescence.

Melamine poly(metal phosphate) are commercially available under the brand name Safire from Catena Additives.

Other exemplary particles which develop its effectiveness through phosphorus/nitrogen synergism and thermal expansion are Amgard PA1 and Amgard PA2, which are nitrogen-phosphorous based particles commercially available from SOLVAY with a particle size (d50) between 6 and 7 microns. Amgard PA1 particles have a phosphorous content of 15%-18% by weight and nitrogen content of 30%-34% by weight. Amgard PA2 particles have a phosphorous content of 17%-20% by weight and nitrogen content of 9%-12% by weight.

Other exemplary commercial fire retardant products include Melapur MC25, MC50, MCXL, 200, 200/70, 200FF, MP. Melapur 200 is melamine polyphosphate commercially available from BASF SE (Ludwigshafen, Germany) and containing 42%-44% by weight of nitrogen and 12% by weight of phosphor.

In some embodiments, it is believed that a combination of selected fire-retardant particles and selected polymeric toughening particles provide a synergistic effect of reducing the heat transfer during a burn-through test (shown in FIG. 1), in which a composite laminate is exposed to a flame producing a temperature surface ranging from 600° C. to 1200° C.

It is also possible, in some embodiments, to have a combination of fire retardant materials that provide enhanced fire retardant properties greater than the additive properties of each fire retardant material. As example, ammonium polyphosphate-based intumescent fire retardant may be combined with at least one of brominated phosphate (e.g., FR 370), melamine phosphate, and melamine polyphosphate fire retardants.

In some embodiments, the resulting cured composite materials containing the combination of particles described herein exhibit Compression Strength After Impact (CAI), after impact at 30 J, of greater than 225 MPa or greater than 250 Mpa as measured in accordance with ASTM D7136/37, and interlaminar fracture toughness under Mode I ($G_{Ic}$) of greater than 350 J/m² or greater than 400 Mpa as measured in accordance to EN6033, and high composite burn-through performance and are compliant with the most common fire, smoke and toxicity (FST) requirements for aircraft applications. Preferably the Compression Strength After Impact (CAI), after impact at 30 J is between 250 and 400 MPa and the interlaminar fracture toughness under Mode I ($G_{Ic}$) is between 400 J/m² and 1000 J/m².

Resin

The curable resin (or resin composition) for impregnating/infusing the reinforcement fibers is preferably a hardenable or thermosettable resin containing one or more uncured thermoset resins, which include, but are not limited to, epoxy resins, imides (such as polyimide or bismaleimide), vinyl ester resins, cyanate ester resins, isocyanate modified epoxy resins, phenolic resins, furanic resins, benzoxazines, formaldehyde condensate resins (such as with urea, melamine or phenol), polyesters, acrylics, hybrids, blends and combinations thereof.

Suitable epoxy resins include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of the bisphenols such as bisphenol A, bisphenol F, bisphenol S and bisphenol K; and polyglycidyl ethers of cresol and phenol based novolacs.

Specific examples are tetraglycidyl derivatives of 4,4'-diaminodiphenylmethane (TGDDM), resorcinol diglycidyl ether, triglycidyl-p-aminophenol, triglycidyl-m-aminophenol, bromobisphenol F diglycidyl ether, tetraglycidyl derivatives of diaminodiphenylmethane, trihydroxyphenyl methane triglycidyl ether, polyglycidylether of phenol-formaldehyde novolac, polyglycidylether of o-cresol novolac or tetraglycidyl ether of tetraphenylethane.

Commercially available epoxy resins suitable for use in the host matrix resin include N,N,N',N'-tetraglycidyl diamino diphenylmethane (e.g. MY 9663, MY 720, and MY 721 from Huntsman); N,N,N',N'-tetraglycidyl-bis(4-aminophenyl)-1,4-diiso-propylbenzene (e.g. EPON 1071 from Momentive); N,N,N',N'-tetraclycidyl-bis(4-amino-3,5-dimethylphenyl)-1,4-diisopropylbenzene, (e.g. EPON 1072 from Momentive); triglycidyl ethers of p-aminophenol (e.g. MY 0510 from Hunstman); triglycidyl ethers of m-aminophenol (e.g. MY 0610 from Hunstman); diglycidyl ethers of bisphenol A based materials such as 2,2-bis(4,4'-dihydroxy phenyl) propane (e.g. DER 661 from Dow, or EPON 828 from Momentive, and Novolac resins preferably of viscosity 8-20 Pa·s at 25° C.; glycidyl ethers of phenol Novolac resins (e.g. DEN 431 or DEN 438 from Dow); di-cyclopentadiene-based phenolic novolac (e.g. Tactix 556 from Huntsman); and diglycidyl derivative of dihydroxy diphenyl methane (Bisphenol F) (e.g. PY 306 from Huntsman).

The curable resin may also comprise phosphorous-modified epoxy or phenolic resin to impart additional fire retardant performance. This modified resin can be obtained by reacting a multifunctional epoxy or phenolic resin (e.g. bisphenol A diglycidyl ether, phenolic polyglycidyl ether, cresol novolac resin) with an organic phosphinic acid (e.g. methanephosphonous acid and diethylphosphinic acid) or anhydride thereof. A specific example is a derivative of DOPO (or 9,10-Dihydro-9-oxa-10-phosphaphenanthrene 10-oxide) which is prepared by reacting a multifunctional epoxy with DOPO. The phosphorus-modified epoxy resins remain reactive prior to curing and can be cured using conventional curing agents. The phosphorus content in the phosphorous-modified epoxy resin may be within the range of about 3% to about 11% by weight. The phosphorous modified epoxy resins or phenolic resins may be liquid or solid at room temperature (20° C.–25° C.) and generally have an epoxy equivalent weight (g/eq) of from about 170 to about 450 as determined by ASTM D-1652. Examples of commercially available, flame retardant, phosphorous-modified epoxy resins include SEN-6030, 6065, 6070, 6075, 6085, 6095, SENP-6630, SEN-275MC 75, SEN-290MC 65, XEN-0140, XEN-0230 from Shin-A T&C Co.; HFC-350, HPC 9080-60P, and EXB-X available from DIC Corp. The phosphorus content in these resins is within the range of 3%-11% by weight.

The curable resin may further comprise red phosphorous. Generally, the addition of between 5% to 10% by weight of red phosphorus can reduce the risk of fire ignition.

Generally, the curable resin contains one or more thermoset resins in combination with other additives such as curing agents, curing catalysts, co-monomers, rheology control agents, tackifiers, inorganic or organic fillers, thermoplastic and/or elastomeric polymers as toughening agents, stabilizers, inhibitors, pigments, dyes, flame retardants, reactive diluents, and other additives well known to those skilled in the art for modifying the properties of the matrix resin before or after curing.

Suitable toughening agents for the curable resin composition include but are not limited to homopolymers or copolymers either alone or in combination of polyamides, copolyamides, polyimides, aramids, polyketones, polyetherimides (PEI), polyetherketones (PEK), polyetherketoneketone (PEKK), polyetheretherketones (PEEK), polyethersulfones (PES), polyetherethersulfones (PEES), polyesters, polyurethanes, polysulphones, polysulphides, polyphenylene oxide (PPO) and modified PPO, poly(ethylene oxide) (PEO) and polypropylene oxide, polystyrenes, polybutadienes, polyacrylates, polymethacrylates, polyacrylics, polyphenylsulfone, high performance hydrocarbon polymers, liquid crystal polymers, elastomers and segmented elastomers.

The addition of curing agent(s) and/or catalyst(s) in the curable matrix resin is optional, but the use of such may increase the cure rate and/or reduce the cure temperatures, if desired. The curing agent is suitably selected from known curing agents, for example, aromatic or aliphatic amines, or guanidine derivatives. An aromatic amine curing agent is preferred, preferably an aromatic amine having at least two amino groups per molecule, and particularly preferable are diaminodiphenyl sulphones, for instance where the amino groups are in the meta- or in the para-positions with respect to the sulphone group. Particular examples are 3,3'- and 4,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylenebis(2,6-diethyl)-aniline (MDEA from Lonza); 4,4'methylenebis-(3-chloro, 2,6-diethyl)-aniline (MCDEA from Lonza); 4,4'methylenebis-(2,6-diisopropyl)-aniline (M-DIPA from Lonza); 3,5-diethyl toluene-2,4/2,6-diamine (D-ETDA 80 from Lonza); 4,4'methylenebis-(2-isopropyl-6-methyl)-aniline (M-MIPA from Lonza); 4-chlorophenyl-N,N-dimethyl-urea (e.g. Monuron); 3,4-dichlorophenyl-N,N-dimethyl-urea (e.g. DIURON™) and dicyanodiamide (e.g. AMICURE™ CG 1200 from Pacific Anchor Chemical).

Suitable curing agents also include anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, and trimellitic anhydride.

The curable matrix resin at the interlaminar region is also a hardenable or thermosettable resin containing one or more uncured thermoset resins of the type discussed above. In certain embodiments, the curable matrix resin at the interlaminar region is the same as the matrix resin in the region containing the reinforcement fibers. In other embodiments, the resin at the interlaminar region is different from the matrix resin in the region containing the reinforcement fibers.

Reinforcement Fibers

For fabricating high-performance composite materials and prepregs, suitable reinforcing fibres have a high tensile strength, preferably greater than 500 ksi (or 3447 MPa) as measured according to ASTM C1557-14. Fibers that are useful for this purpose include carbon or graphite fibres, glass fibres and fibres formed of silicon carbide, alumina, boron, quartz, and the like, as well as fibres formed from organic polymers such as for example polyolefins, poly (benzothiazole), poly(benzimidazole), polyarylates, poly (benzoxazole), aromatic polyamides, polyaryl ethers and the like, and may include mixtures having two or more such fibres. Preferably, the fibers are selected from glass fibers, carbon fibers and aromatic polyamide fibers, such as the fibers sold by the DuPont Company under the trade name KEVLAR. The reinforcement fibers may be used in the form of discontinuous or continuous tows made up of multiple filaments, as continuous unidirectional or multidirectional tapes, or as woven, non-crimped, or nonwoven fabrics. The woven form may be selected from plain, satin, or twill weave style. The non-crimped fabric may have a number of plies and fiber orientations.

Fibres may be sized or unsized. Fibres can be added typically at a concentration of 5 to 35, preferably at least 20%, by weight. For structural applications, it is preferred to use continuous fibre for example glass or carbon, especially at 30% to 70%, more especially 50% to 70% by volume.

Manufacturing of Composite Prepreg and Laminates

According to one embodiment, specific amounts of polymeric toughening particles and fire retardant particles are mixed with the curable resin composition prior to impregnation of reinforcement fibers (i.e., prior to the prepreg manufacturing). To make a prepreg ply, a resin film is manufactured first by coating the particle-containing resin composition onto a release paper. Next, one or two of such resin film is/are laminated onto one or both sides of a layer of reinforcement fibers under the aid of heat and pressure to impregnate the fibers, thereby forming a fibre-reinforced polymer layer (or prepreg ply) with specific fiber areal weight and resin content. During the laminating process, the particles are filtered out and remain external to the fibre layer due to the fact that the size of the particles is larger than the spacing between the fibre filaments. The resulting prepreg ply contains a structural fiber-reinforced layer adjacent to one or two layers of matrix resin in which the particles are embedded. Subsequently, when two or more prepreg plies containing toughening particles therein are laminated one on top of the other via a laying up process, the particles are positioned in the interlaminar region between two adjacent fiber layers. In this embodiment, the matrix resin at the interlaminar region (without particles) is the same as the resin impregnating the reinforcement fibers.

In another embodiment, a curable resin without particles is coated onto a release paper to form a resin film. This resin film is then brought into contact with one side of a fiber layer. Upon application of pressure, the resin film impregnates the fibers and leaves a little or no resin on the external surfaces of the fiber layer. Subsequently, a film of curable resin containing particles is laminated to an exposed outer surface of the resin-impregnated fiber layer. The curable resin carrying the particles may be the same as or different from the resin impregnating the reinforcement fibers. As a result, a particle-containing resin layer remains outside of the impregnated fiber layer and does not further impregnate the fibers. A plurality of such structures are laminated together to form a composite laminate with fire retardant particles and polymeric toughening particles positioned in the interlaminar regions.

The term "prepreg" as used herein refers to a sheet or layer of fibres that has been impregnated with a curable resin composition within at least a portion of the fibrous volume. The prepreg used for manufacturing aerospace structures is usually a resin-impregnated sheet of continuous reinforcing fibres, e.g. carbon fibers, The prepregs may be fully impregnated prepregs or partially impregnated prepregs. The matrix resin impregnating the reinforcement fibers may be in a partially cured or uncured state. In one embodiment the prepreg used for manufacturing aerospace structures may be composed of uni-directional reinforcing fibres, e.g. carbon fibers, which is often referred to as "tape" or "uni-directional tape". In another embodiment the prepreg used for manufacturing aerospace structures may be composed of reinforcing fibres orientated in two directions, which is often referred to as "fabric" or "by-axial tape".

Typically, the prepreg is in a pliable or flexible form that is ready for laying up and molding into a three-dimensional configuration, followed by curing into a final composite part/structure. This type of prepregs is particularly suitable for manufacturing load-bearing structural parts, such as wings, fuselages, bulkheads and control surfaces of aircrafts. Important properties of the cured prepregs are high strength and stiffness with reduced weight.

To form a composite structure, a plurality of prepreg plies may be laid up on a tool in a stacking sequence to form a "prepreg lay-up". In most common aircraft primary structures, multiple uni-directional tapes are assembled together to create a lay-up with plies orientated in different directions to create a composite structure having load bearing capabilities in different directions. The prepreg plies within the layup may be positioned in a selected orientation with respect to one another, e.g. 0°, ±45°, 90°, etc. Prepreg lay-ups may be manufactured by techniques that may include, but are not limited to, hand lay-up, automated tape layup (ATL), advanced fibre placement (AFP), and filament winding. In some embodiments the composite structures may be assembled "uni-directional tape". In another embodiment the prepreg used for manufacturing aerospace structures may be composed of uni-directional tapes and by-axial tapes. For examples it's well known that a fabric has the ability to provide fire protection greater than a uni-directional tape and for this reason is often used as outer layer in composite structures which require fire protection or burn-through capabilities.

Curing of the composite material or prepreg layup disclosed herein is generally carried out at elevated temperature up to 200° C., preferably in the range of 170° C.-190° C., and with use of elevated pressure to restrain deforming effects of escaping gases, or to restrain void formation, suitably at pressure of up to 10 bar (1 MPa), preferably in the range of 3 bar (0.3 MPa) to 7 bar (0.7 MPa). Preferably, the cure temperature is attained by heating at up to 5° C./min, for example 2° C./min to 3° C./min and is maintained for the required period of up to 9 h, preferably up to 6 h, for example 2 h to 4 h. The use of a catalyst in the matrix resin may allow even lower cure temperatures. Pressure is released throughout, and temperature is reduced by cooling at up to 5° C./min, for example up to 3° C./min. Post-curing at temperatures in the range of 190° C. to 350° C. and atmospheric pressure may be performed, employing suitable heating rates to improve the glass transition temperature of the matrix resin.

Application

The composite materials disclosed herein may be in the form of prepregs that are suitable for manufacturing aircraft structures having good burn-through protection capabilities and low flame propagation in hidden areas. For examples, the composite prepregs may be used for fabricating primary and secondary aircraft structures, space and ballistics structures. Such structural components include composite fuselage and wing structures. Notably, the composite prepreg is particularly suitable for the fabrication of load-bearing or impact-resisting structures that would need to satisfy flammability requirements. The prepregs disclosed herein are also applicable to the manufacture of components for other transportation applications, including aeronautical, nautical, automotive, and railroad.

EXAMPLES

Composite panels produced in the following Examples were tested according to the following procedure for flammability and mechanical performance evaluation.

a. 60-Sec Vertical Burning Testing Procedures

Flammability is how easily something will burn or ignite, causing fire or combustion. The flammability test FAR 25.853 or CS25 App.F Part-I (a)(1)(i) is a simple test used to assess whether a material burns subjected to the action of a flame.

Coupons for 60-sec vertical burning tests having a dimension of 75 mm×300 mm were extracted from defect free baseline panels. Coupons were suspended vertically and exposed to a flame of 38 mm high. The flame is applied for a period of 60 seconds. After this period, the burner is removed and the flame time was detected.

Flame time is the time in seconds that the specimen continues to flame after the burner flame is removed from beneath the specimen. Surface burning resulting in a glow but not in a flame is not included.

The criteria for the flammability classification of materials according to FAR25.853 or CS25 App.F Part-I (a)(1)(i) is that to PASS the test the average flame time should not exceed 15 sec.

b. Toxicity Tests

The toxicity of the smoke generated in a, for epoxy resin/carbon fibre coupons was measured according to BSS 7239.

Coupons having a dimension of 75×75×1.6 mm³ were conditioned at 21±3° C.-50±5% r.h. for 24 h and subjected to a constant irradiation of 25 KW/m² in a closed chamber (NBS—smoke density chamber). Three (3) tests were performed for each sample. The duration of each test was 300 seconds. During the tests, the value of the concentration of Sulfur Dioxide ($SO_2$) was determined using colorimetric Draeger® pipe.

c. Burn-Through Testing Procedures

Figure 2:
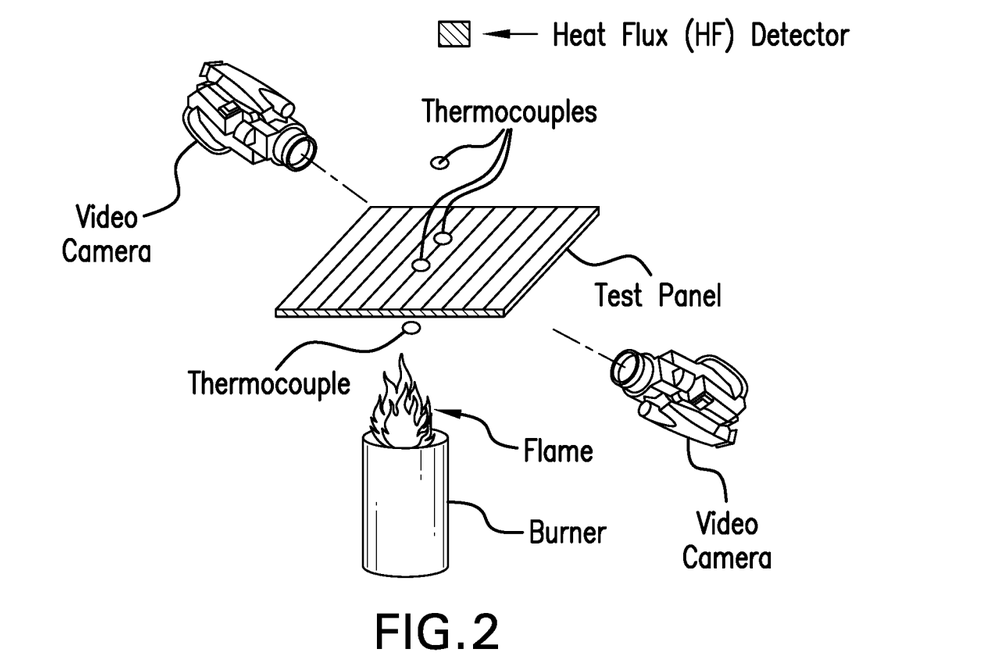
FIG. 2 schematically illustrates the set-up for burn-through tests.

Tests were carried out on 40 cm×40 cm flat panels using a propane burner as heat source calibrated using the flame temperature. To simulate a post-crash fire, the heat flux at the panel surface was fixed to 182 kW/m² with a flame temperature of about 1160° C. A sheathed thermocouple (type N) was positioned closed to the panel at the "hot face" to monitor the flame temperature during the test. Three thermocouples type K were used to monitor the temperature profile of the "cold face" in direct contact with the panel. An additional thermocouple and a heat flux (HF) detector were also positioned respectively at a distance of 30.48 cm or 12 inches from panel to monitor the temperature and heat flux of the hot gasses above the panel during the test. Two video-cameras were used to detect fire penetration through the panel and to evaluate the panel response during the test. Burn-through tests were performed for 5 minutes, while temperatures at "hot face" (fire exposed surface) and "cold face" were monitored. FIG. 2 illustrates the set-up for this test.

Tested panels were also visually inspected and results were evaluated according to the following damage level criteria:

5=panel severely damaged: cold face of the panel with >60% of visible dry fibers 4=panel badly damaged: cold face with 40-60% of visible dry fibers.

3=panel damaged: cold face side with 20-40% of visible dry fibers

2=panel slight damaged: cold face with 10-20% of visible dry fibers

1=panel little damaged: cold face with no or less than 10% of visible dry fibers.

d. Mechanical Characterization

Compression after impact (CAI) after a 30 Joule impact was determined using 24-ply quasi-isotropic laminates. Measurements were performed at room temperature on coupons extracted from defect free panels prepared in accordance with EN 2565 method B and cured for 2 hours at 180° C. The specimens were machined, impacted and tested in accordance with ASTM D7136/37.

Inter-laminar fracture toughness in mode I ($G_{Ic}$) was determined using a 16-ply unidirectional laminate cured with a fluoro-ethylene polymer (FEP) film as crack starter at the mid plane. $G_{Ic}$ measurements were performed at room temperature according to EN 6033 on coupons extracted from defect free panels prepared in accordance with EN 2565 method B and cured for 2 hours at 180° C.

Open Hole Compression was measured according to ASTM D6484. Apparent interlaminar shear strength (ILSS) was measured according to EN 2563.

Example 1: Combination of Toughening Nylon Particles and Ammonium Polyphosphate Prepregs Manufacturing Five resin compositions were prepared according to the formulations shown in Table 1. Resin composition Control 1.0 does not contain any particles. Each of the other resin compositions was modified with different combination of polymeric toughening particles and fire retardant particles. The amounts of the components are reported in weight by weight (w/w) percentages.

TABLE 1

Resin Compositions

| Components | Resin code | | | | |
| --- | --- | --- | --- | --- | --- |
|  | Control 1.0 | Comparative 1.1 | Comparative 1.2 | Resin 1.3 | Resin 1.4 |
| Araldite ® PY306 | 26.3 | 23.0 | 21.5 | 23.0 | 21.5 |
| Araldite ® MY0510 | 26.3 | 23.0 | 21.5 | 23.0 | 21.5 |
| SUMIKAEXCEL 5003P | 19.5 | 18.6 | 17.2 | 18.6 | 17.2 |
| (a) Exolit ® AP462 | — | — | 18.0 | 6.0 | 12.0 |
| (b) Vestosint ® Z2649 | — | 12.0 | — | 6.0 | 6.0 |
| 4,4'DDS | 28.2 | 23.4 | 21.8 | 23.4 | 21.8 |

Materials:

Araldite PY 306 is a Bisphenol F diglycidlyl ether resin available from Huntsman. Araldite MY 0510 is a triglycidyl ether of p-aminophenol resin available from Huntsman.

SUMIKAEXCEL 5003P is a polyethersulfone polymer available from Sumitomo Chemical.

Exolit® AP 462 (particles a) is an ammonium polyphosphate particle with a melamine based coating with a mean particle size of 20 microns commercialized by Clariant. Vestosint® Z2649 (particles b) is an aliphatic nylon particle available from Evonik.

Prepregs were manufactured using the resin formulations of Table 1 to impregnate unidirectional carbon fibers. Resin formulations were used for manufacturing two (2) films having an areal weight of about 50 gsm each film. Then the films were used for impregnating IMS65 E23 24K carbon fibers commercially available from Toho Tenax, resulting in prepregs each with a fiber areal weight of about 190 gsm and resin content between 35% and 36% w/w as reported in Table 2.

TABLE 2

Prepregs

| Prepreg code | Resin code | Total Interlaminar particles (w/w %) | Polymeric toughening particles | Fire retardant particles | Fibers | Resin Content (%) |
| --- | --- | --- | --- | --- | --- | --- |
| Control Prepreg 1.0 | 1.0 | — | — | — | IMS65 E23 24K | 35 |
| Comparative Prepreg 1.1 | 1.1 | 12 | Vestosint ® Z2649 | — | IMS65 E23 24K | 36 |

TABLE 2-continued

| | | Prepregs | | | | |
|---|---|---|---|---|---|---|
| Prepreg code | Resin code | Total Interlaminar particles (w/w %) | Polymeric toughening particles | Fire retardant particles | Fibers | Resin Content (%) |
| Comparative Prepreg 1.2 | 1.2 | 18 | — | AP462 | IMS65 E23 24K | 36 |
| Prepreg 1.3 | 1.3 | 12 | Vestosint ® Z2649 | AP462 | IMS65 E23 24K | 36 |
| Prepreg 1.4 | 1.4 | 18 | Vestosint ® Z2649 | AP462 | IMS65 E23 24K | 36 |

Vertical Burning and Toxicity Test Results

Control prepreg 1.0 having no particles was used for manufacturing Control Panel 2.0 with 16 plies, lay-up equal to $[+,0,-,90]_{2s}$ and thickness of about 3.2 mm. A plurality of Prepregs 1.1, 1.3 and 1.4 was used to prepare respectively composite Panels 2.1, 2.2 and 2.3 in Table 3. These panels were manufactured by laying up the prepregs to form lay-ups with quasi-isotropic configuration $[+,0,-,90]_{2s}$ (each layup being about 3.2 mm thick) followed by consolidation and curing in an autoclave for 2 hours at 177° C. and at 6 bar pressure. The particle-containing prepregs were laid up so that said particles remain in the interleaf regions of the layup. All cured panels were subjected to 60-sec Vertical Burning and Toxicity testing. The flammability and toxicity test results are reported in Table 3.

TABLE 3

Comparative flammability and toxicity data

| | Lay-up | Prepreg | Particle (b) Z2649/Nylon | Particle (a) AP462 | Flame time (s) | $SO_2$ content (ppm) |
|---|---|---|---|---|---|---|
| Control Panel 2.0 | $[+, 0, -, 90]_{2s}$ | 1.0 | — | — | 17 ± 5 | 100 |
| Comparative Panel 2.1 | $[+, 0, -, 90]_{2s}$ | 1.1 | 12% w/w | — | 25 ± 3 | 100 |
| Panel 2.2 | $[+, 0, -, 90]_{2s}$ | 1.3 | 6% w/w | 6% w/w | 7 ± 2 | 20 |
| Panel 2.3 | $[+, 0, -, 90]_{2s}$ | 1.4 | 6% w/w | 12% w/w | 4 ± 1 | 20 |

Control Panel 2.0, which had no interlaminar particles, showed high average flame time during the 60-sec Vertical Burning test (17 sec) and produced high $SO_2$ content (100 ppm) during toxicity tests. Such high flame time would have presented a serious risk to passengers if this occurred during an actual fire and combustion of an aircraft composite part. The addition of Vestosint® Z2649 nylon particles (Comparative Panel 2.1) provided even higher flame time and the same $SO_2$ content. However, the combination of Vestosint® Z2649 nylon particles and Exolit® AP 462 (Panels 2.2 and 2.3) provided a significant improvement in the flammability performance, as seen by a reduction of the average flame time during the 60-sec Vertical Burning Test and the reduction in emission of $SO_2$ content during Toxicity testing as compared to panels having polymeric toughening particles only (Comparative Panel 2.1) or having no particles (Control Panel 2.0).

Burn-Through Test Results

A plurality of Control Prepreg 1.0 was used for manufacturing Control Panel 2.4 having a dimension of 40 cm×40 cm. Panels 2.5 and 2.6 were produced from a plurality of Prepreg 1.2 and Prepreg 1.4, respectively. These panels were manufactured by laying up the prepregs to form lay-ups with quasi-isotropic configuration [+,−,0,90]s (each layup being about 1.6 mm thick), followed by consolidation and curing in an autoclave for 2 hours at 177° C. and at 6 bar pressure. All cured panels were subjected to the burn-through test and the results are reported in Table 4.

TABLE 4

Burn-through comparative test results

| | Prepreg | Particle (b) Z2649/Nylon | Particle (a) AP462 | Cold-face temperature after 2 min | Cold-face temperature after 4 min | Max HF at 12" (KW/m²) | Damage level |
|---|---|---|---|---|---|---|---|
| Control Panel 2.4 | 1.1 | 12% w/w | — | 421° C. | 498° C. | 8.41 | 5 |
| Comparative Panel 2.5 | 1.2 | — | 18% w/w | 323° C. | 420° C. | 6.97 | 4 |
| Panel 2.6 | 1.4 | 6% w/w | 12% w/w | 291° C. | 371° C. | 6.44 | 3 |

The results in Table 4 show that Control Panel 2.4, containing only Vestosint® Z2649 nylon particles (b), provided poor burn-through protection performance. During the test, the temperature on the hot face of the panel was about 1160° C. The temperature on the cold face of the panel increased quickly as a function of the fire exposure time and it reached more than 400° C. in about 2 min. Such rapid temperature increase would be catastrophic if this occurred on an aircraft composite part such as a composite fuselage skin because it would have caused a collapse of structural components (such as the frames) under low loads. After 5 minutes of fire exposure, the panel appeared severely damaged with more than 60% of visible dry fibers at the panel cold-face (damage level is classified 5 according to the criteria discussed above for the Burn-Through Test procedure).

The results in Table 4 show that Comparative Panel 2.5, containing 18% w/w of AP462 fire retardant particles (a), provided an improvement in the burn-through protection performance. Panel 2.6, which contained the combination of particles (a) and (b), provided the lowest temperature and the lowest heat flux at the panel's back side, and the lowest damage level after 5 minutes of fire exposure among all the manufactured panels. For Panel 2.6, the temperature reduction was about 30° C. at the panel cold-face after 2 minutes and about 50° C. after 4 minutes of burn-through test as compared to Panel 2.5 containing AP462 particles only. Surprisingly, the damage level of Panel 2.6 after testing (damage level 3—see Table 3) is lower than the damage level of comparative Panel 2.5 (damage level 4—see Table 3) and Control Panel 2.4 (damage level 5—see Table 3). This is surprising because Panel 2.6 has a reduced amount of fire retardant particles in the resin composition comparing to comparative Panel 2.5 and the use of nylon particles was not expected to provide good flammability results if not in combination with a certain amount of fire retardant particles.

Mechanical Test Results

Control panel 2.7 was manufactured by laying up 24 plies of Control Prepreg 1.0 according to [+,0,−,90]$_{3s}$ configuration, followed by consolidation and curing in an autoclave for 2 hours at 177° C. and at 6 bar pressure. Panels 2.8 and 2.9 were produced from a plurality of Prepreg 1.2 and Prepreg 1.4, respectively. Defect free coupons were extracted from the panels and subjected to CAI testing. The panel's details and mechanical test results are reported in Table 5.

TABLE 5

Comparative mechanical test results

| | Prepreg | Particle (b) Z2649/Nylon | Particle (a) AP462 | CAI_30J [J/m²] |
|---|---|---|---|---|
| Control Panel 2.7 | 1.0 | — | — | 209 ± 11 |
| Comparative Panel 2.8 | 1.2 | — | 18% w/w | 208 ± 12 |
| Panel 2.9 | 1.4 | 6% w/w | 12% w/w | 267 ± 6 |

The results of Table 5 show that the addition of only fire-retardant particles (a) in the interlaminar region (Comparative Panel 2.8) did not provide improvement comparing to the Control Panel 2.7 having no particles. But the combination of nylon toughening particles (b) and fire-retardant particles (a) in Panel 2.9 provided more than 50 MPa improvement in CAI value as compared to Control Panel 2.7 and Comparative Panel 2.8.

One extra panel (Panel 2.10) was manufactured by laying up 16 plies of Prepreg 1.4 for Fracture toughness tests providing $G_{Ic}$ equal to 488 J/m². This result shows that the combination of nylon toughening particles (b) and fire-retardant particles (a) in the interlaminar regions of Panel 2.9 provided CAI after 30 J impact above 250 J/m², $G_{Ic}$ above 400 J/m² and provided excellent flammability performance during Vertical Burning and Toxicity testing (see Table 3) and Burn-through testing (see Table 4).

Example 2: Combination of Toughening Polyimide Particles and Ammonium Polyphosphate Prepregs Manufacturing Three resin compositions were prepared according to the formulations shown in Table 6. Resin composition Control 1.0, which did not contain any particles, is considered as reference. The various resin compositions contained different combination of polymeric toughening particles and fire retardant particles. The amounts are reported in weight by weight (w/w) percentages.

TABLE 6

Resin Compositions

| | Resin code | | |
|---|---|---|---|
| Components | Comparative 3.1 | Example 3.2 | Example 3.3 |
| Araldite ® PY306 | 23.0 | 23.0 | 21.5 |
| Araldite ® MY0510 | 23.0 | 23.0 | 21.5 |
| SUMIKAEXCEL 5003P | 18.6 | 18.6 | 17.2 |
| (a) Exolit ® AP462 | — | 6.0 | 12.0 |
| (c) P84 NT1 | 12.0 | 6.0 | 6.0 |
| 4,4'DDS | 23.4 | 23.4 | 21.8 |

P84 NT1 (particles c) are aromatic polyimide particles from Evonik with an average particle size distribution d50 of 44 microns, which swell and solubilize (dissolve) into the surrounding resin upon curing. Prepregs were manufactured using the resin formulations of Table 6 to impregnate unidirectional carbon fibers IMS65 E23 24K as for Example 1, resulting in three prepregs each with a fiber areal weight of about 190 gsm and resin content between 35% and 36% w/w as reported in Table 7.

TABLE 7

| Prepreg code | Resin code | Total Interlaminar particles (w/w %) | Polymeric toughening particles | Fire retardant particles | Fibers | Resin Content (%) |
|---|---|---|---|---|---|---|
| Comparative Prepreg 3.1 | 3.1 | 12 | P84 NT1 | — | IMS65 E23 24K | 35 |
| Prepreg 3.2 | 3.2 | 12 | P84 NT1 | AP462 | IMS65 E23 24K | 36 |
| Prepreg 3.3 | 3.3 | 18 | P84 NT1 | AP462 | IMS65 E23 24K | 36 |

Vertical Burning and Toxicity Test

A plurality of Prepregs 3.1, 3.2 and 3.3 were used to prepare respectively composite Panels 4.1, 4,2 and 4.3 disclosed in Table 8. Panel manufacturing and coupon testing were similar to the procedures described in Example 1. Test results are reported in Table 8. For comparison, the results generated on Control Panel 2.0, which had no interlaminar particles, are also reported in Table 8.

TABLE 8

Comparative flammability and toxicity data

| | Lay-up | Prepreg | Particle (c) P84 NT1 | Particle (a) AP462 | Average flame time (s) | $SO_2$ content (ppm) |
|---|---|---|---|---|---|---|
| Control Panel 2.0 | [+, 0, −, 90]$_{2s}$ | 1.0 | — | — | 17 ± 5 | 100 |
| Comparative Panel 4.1 | [+, 0, −, 90]$_{2s}$ | 3.1 | 12% w/w | — | 15 ± 1 | 60 |
| Panel 4.2 | [+, 0, −, 90]$_{2s}$ | 3.2 | 6% w/w | 6% w/w | 5 ± 3 | <20 |
| Panel 4.3 | [+, 0, −, 90]$_{2s}$ | 3.3 | 6% w/w | 12% w/w | 5 ± 2 | <20 |

The combination of polyimide toughening particles P84 NT1 and Exolit® AP 462 (Panels 4.2 and 4.3) provided a significant improvement in the flammability performance, as seen by a reduction of the average flame time during the 60-sec Vertical Burning Test and a reduction in the emission the $SO_2$ content during Toxicity test comparing to panels having polymeric toughening particles only (Comparative Panel 4.1) or having no particles (Control Panel 2.0).

Burn-Through Test Results

A plurality of Prepregs 3.1 and 3.3 were used to prepare respectively composite Panels 4.4 and 4.5 disclosed in Table 9. Panel manufacturing and testing were similar to the procedure described in Example 1. Test results are reported in Table 9. For comparison, the results generated on Comparative Panel 2.5 having AP462 particles only are also reported in Table 9.

The results of Table 9 show that Control Panel 4.4, containing P84 NT1 (polyimide) interlaminar particles only, provided poor burn-through protection performance. Panel 4.5 containing the combination of the two particles (a) and (c) provided a significant temperature reduction at panel's back side comparing to Control Panel 4.4 and Comparative Panel 2.5, and a significant reduction in the damage level. As in the case of Panel 2.6 in Example 1, this effect is surprising because Panel 4.5 had a reduced amount of fire retardant particles in the resin composition comparing to Comparative Panel 2.5 and the use of polyimide particles was not expected to provide good flammability results if not in combination with a certain amount of fire retardant particles.

Mechanical Test Results

A plurality of Prepreg 3.3 was used to prepare composite Panels 4.6 and 4.7 for CAI and $G_{Ic}$ tests, respectively. The panel's details and mechanical test results are reported in Table 10. For comparison, the results for Control Panel 2.7 having no interlaminar particles are also reported.

Table 10 shows that the combination of P84 NT1 and AP462 particles in the interlaminar region of Panels 4.6 and 4.7 provided CAI after 30 J impact of above 250 MPa (specifically, 252 MPa), $G_{Ic}$ above 400 J (specifically, 477 J/m$^2$) and provided excellent flammability performance as

TABLE 9

Burn-through comparative test results

| | Prepreg | Particle (c) P84 NT1 | Particle (a) AP462 | Cold-face temperature after 2 min | Cold-face temperature after 4 min | Max HF at 12" (KW/m$^2$) | Damage level |
|---|---|---|---|---|---|---|---|
| Control Panel 4.4 | 3.1 | 12% w/w | — | 415° C. | 490° C. | 8.15 | 5 |
| Comparative Panel 2.5 | 1.2 | — | 18% w/w | 323° C. | 420° C. | 6.97 | 4 |
| Panel 4.5 | 3.3 | 6% w/w | 12% w/w | 290° C. | 375° C. | 6.50 | 3 | reported in Table 8 and 9. It was found that $G_{Ic}$ is about 50% greater than a similar panel having no interlaminar particles (Control Panel 2.11).

TABLE 10

Comparative mechanical test results

| | Prepreg | Particle (c) P84 NT1 | Particle (a) AP462 | CAI_30J (MPa) | $G_{Ic}$ [J/m²] |
|---|---|---|---|---|---|
| Control Panels 2.7, 2.11 | 1.0 | — | — | 209 ± 11 | 289 ± 30 |
| Panels 4.6, 4.7 | 3.3 | 6% w/w | 12% w/w | 252 ± 13 | 477 ± 61 |

Multiply plies of Prepreg 3.3 were also used for manufacturing additional panels for OHC tests performed in accordance to ASTM D6484 and ILSS tests performed according to EN 2563. Table 11 reports the mechanical test results showing good compression load and interlaminar shear capabilities of the panels manufactured from a prepreg comprising a combination of polymeric toughening particles and fire retardant particles.

TABLE 11

Mechanical data of laminates

| Panels | Prepreg | Properties | Standard | Values |
|---|---|---|---|---|
| 4.8 | 3.3 | Open Hole Compression | ASTM D6484 | 350 ± 9 Mpa |
| 4.9 | 3.3 | Apparent ILSS | EN 2563 | 116 ± 2 Mpa |

Example 3: Combination of Crosslinked Thermoplastic Particles and Ammonium Polyphosphate Prepregs Manufacturing Two resin compositions were prepared according to the formulations shown in Table 12. Resin composition Control 1.0, which did not contain any particles, is considered as reference. The various resin compositions contained different combination of polymeric toughening particles and fire retardant particles. The amounts are reported in weight by weight (w/w) percentages.

TABLE 12

Resin Compositions

| | Resin code | |
|---|---|---|
| Components | Comparative 5.1 | Example 5.2 |
| Araldite ® PY306 | 23.0 | 21.5 |
| Araldite ® MY0510 | 23.0 | 21.5 |
| SUMIKAEXCEL 5003P | 18.6 | 17.2 |
| (a) Exolit ® AP462 | — | 12.0 |
| (d) PES-PEES | 12.0 | 6.0 |
| 4,4'DDS | 23.4 | 21.8 |

Particles (d) are particles of cross-linked PES-PEES with a mean particle size of 25 microns, which were produced internally. Prepregs were manufactured using the resin formulations of Table 12 to impregnate unidirectional carbon fibers IMS65 E23 24K as for Example 1, resulting in 2 (two) prepregs each with a fiber areal weight of about 190 gsm and resin content of about 36% w/w as reported in Table 13.

TABLE 13

Prepregs

| Prepreg code | Resin code | Total Interlaminar particles (w/w %) | Polymeric toughening particles | Fire retardant particles | Fibers | Resin Content (%) |
|---|---|---|---|---|---|---|
| Comparative Prepreg 5.1 | 5.1 | 12 | PES-PEES | — | IMS65 E23 24K | 36 |
| Prepreg 5.2 | 5.2 | 18 | PES-PEES | AP462 | IMS65 E23 24K | 36 |

Vertical Burning and Toxicity Test Results

A plurality of Prepregs 5.1 and 5.2 were used to prepare, respectively, composite Panels 6.1 and 6.2 disclosed in Table 14. Panel manufacturing and coupon testing were similar to the procedure described in Example 1. Test results are reported in Table 14. For comparison, the results generated on Control Panel 2.0, which had no interlaminar particles, are also reported in Table 14.

TABLE 14

Comparative flammability and toxicity data

| | Lay-up | Prepreg | Particle (d) PES-PEES | Particle (a) AP462 | Average flame time (s) | $SO_2$ content (ppm) |
|---|---|---|---|---|---|---|
| Control Panel 2.0 | [+, 0, −, 90]$_{2s}$ | 1.0 | — | — | 17 ± 5 | 100 |
| Comparative Panel 6.1 | [+, 0, −, 90]$_{2s}$ | 5.1 | 12% w/w | — | 15 ± 3 | 100 |
| Example 6.2 | [+, 0, −, 90]$_{2s}$ | 5.2 | 6% w/w | 12% w/w | 4 ± 1 | 40 |

The combination of crosslinked PES-PEES particles and Exolit® AP 462 (Panels 6.2) provided a significant improvement in the flammability performance, as shown by a reduction in the average flame time during the 60-sec Vertical Burning Test and the reduction in $SO_2$ content during the Toxicity test as compared to Comparative Panel 6.1 containing polymeric toughening particles only and Control Panel 2.0 containing no particles.

Burn-Through Test Results

A plurality of Prepregs 5.1 and 5.2 were used to prepare, respectively, composite Panels 6.3 and 6.4 disclosed in Table 15. Panel manufacturing and testing were similar to the procedure described in Example 1. Test results are reported in Table 15. For comparison, results generated on Comparative Panel 2.5 having AP462 particles only are also reported in Table 15.

TABLE 15

Burn-through comparative test results

| | Prepreg | Particle (d) PES-PEES | Particle (a) AP462 | Cold-face temperature after 2 min | Cold-face temperature after 4 min | Max HF at 12" (KW/m$^2$) | Damage level |
|---|---|---|---|---|---|---|---|
| Control Panel 6.3 | 5.1 | 12% w/w | — | 425° C. | 500° C. | 8.50 | 5 |
| Comparative Panel 2.5 | 1.2 | — | 18% w/w | 323° C. | 420° C. | 6.97 | 4 |
| Panel 6.4 | 5.2 | 6% w/w | 12% w/w | 300° C. | 386° C. | 6.60 | 3 |

The results of Table 15 show that Control Panel 6.3, containing only crosslinked PES-PEES particles at the interlaminar region provided poor burn-through protection performance. Panel 6.4, which contained the combination of the two particles (a) and (d), provided a significant temperature reduction at panel back side and a significant reduction in the damage level as compared to Control Panel 6.3 and Comparative Panel 2.5. As for Example 1, this effect is surprising because Panel 6.4 had a reduced amount of fire retardant particles in the resin composition comparing to Comparative Panel 2.5, and the use of crosslinked thermoplastic particles was not expected to provide good flammability results when not in combination with a certain amount of fire retardant particles.

Mechanical Test Results

Panels 6.5 and 6.6 were manufactured using Prepregs 5.2 for CAI and $G_{Ic}$ tests similar to the procedures described in Examples 1 and 2. The mechanical results are reported in Table 16 in comparison with results on Control Panels 2.7 and 2.11 having no interlaminar particles.

TABLE 16

Comparative mechanical data

| | Prepreg | Particle (d) PES-PEES | Particle (a) AP462 | CAI_30J (MPa) | $G_{Ic}$ [J/m$^2$] |
|---|---|---|---|---|---|
| Control Panels 2.7, 2.11 | 1.0 | — | — | 209 ± 11 | 289 ± 30 |
| Panels 6.5, 6.6 | 5.2 | 6% w/w | 12% w/w | 308 ± 7 | 402 ± 41 |

Tables 14 and 16 show that the combination of crosslinked thermoplastic particles and fire retardant particles in the interlaminar region of Panels 6.5 and 6.6 provided CAI after 30 J impact of 308 MPa, $G_{Ic}$ above 400 J/m$^2$, and provided excellent flammability performance.

Multiply plies of Prepreg 5.2 were also used for manufacturing additional panels (Panels 6.7 and 6.8) for OHC and ILSS tests. Table 17 reports the mechanical test results showing good compression load and interlaminar shear capabilities of the panels manufactured from a prepreg comprising a combination of polymeric toughening particles and fire retardant particles

TABLE 17

Mechanical data of laminates

| Panels | Prepreg | Properties | Standard | Values |
|---|---|---|---|---|
| 6.7 | 5.2 | Open Hole Compression | ASTM D6484 | 371.7 ± 3.1 Mpa |
| 6.8 | 5.2 | Apparent ILSS | EN 2563 | 111.1 ± 0.5 Mpa |

Example 4: Combination of Conductive Polyimide Particles and Ammonium Polyphosphate Prepreg Manufacturing Resin composition 7.1 was prepared according to the formulation shown in Table 18. Resin composition Control 1.0, which did not contain any particles, is considered as reference. The amounts are reported in weight by weight (w/w) percentages. NT1-15G (particles e) are conductive polyimide particles from Evonik containing 15% w/w synthetic graphite.

TABLE 18

Resin Composition

| Components | Resin code 7.1 |
|---|---|
| Araldite ® PY306 | 23.0 |
| Araldite ® MY0510 | 23.0 |
| SUMIKAEXCEL 5003P | 18.6 |
| (a) Exolit AP462 | 6.0 |
| (e) NT1-15G | 6.0 |
| 4,4'DDS | 23.4 |

Vertical Burning and Toxicity Test Results

Resin 7.1 was used for impregnating unidirection carbon fibers IMS65 E23 24K as for previous examples, resulting in Prepreg 7.1 with a fiber areal weight of about 190 gsm and resin content of about 36% by weight.

A plurality of Prepreg 7.1 was used to prepare composite Panel 8.1. Panel manufacturing and coupon testing were similar to the procedure described in previous Examples. Test results are reported in Table 19 showing that the combination of conductive polyimide particles NT1-15G (particles e) and Exolit AP 462 particles (a) in Panel 8.1 provided a significant improvement in the flammability performance, as shown by a reduction in both the average flame time during the 60-sec Vertical Burning Test and the $SO_2$ content during the Toxicity Test as compared to Control Panel 2.0 containing no particles.

TABLE 19

Comparative flammability and toxicity data

|  | Lay-up | Prepreg | Particle (e) NT1-15G | Particle (a) AP462 | Average flame time (s) | SO$_2$ content (ppm) |
|---|---|---|---|---|---|---|
| Control Panel 2.0 | [+, 0, −, 90]$_{2s}$ | 1.0 | — | — | 17 ± 5 | 100 |
| Panel 8.1 | [+, 0, −, 90]$_{2s}$ | 7.1 | 6% w/w | 12% w/w | 4 ± 1 | 40 |

Mechanical Test Results

Panels 8.2 and 8.3 were manufactured using Prepreg 7.1 for CAI and G$_{Ic}$ tests similar to the procedures described before. The mechanical results are reported in Table 20 in comparison with results on Control Panels 2.7 and 2.11 having no interlaminar particles.

TABLE 20

Comparative mechanical data

|  | Prepreg | Particle (e) NT1-15G | Particle (a) AP462 | CAI_30J (MPa) | G$_{Ic}$ [J/m$^2$] |
|---|---|---|---|---|---|
| Control Panels 2.7, 2.11 | 1.0 | — | — | 209 ± 11 | 289 ± 30 |
| Panels 8.2, 8.3 | 7.1 | 6% w/w | 12% w/w | 229 ± 5 | 417 ± 40 |

Tables 19 and 20 show that the combination of conductive polyimide particles and fire retardant particles in the interlaminar region of Panels 8.2 and 8.3 provided CAI after 30 J impact of 229 MPa, G$_{Ic}$ of 417 J/m$^2$, and provided excellent flammability performance.

Multiply plies of Prepreg 7.1 were also used for manufacturing Panels 8.4 and 8.5 for OHC and ILSS tests. The test results, reported in Table 21, show the good compression load and interlaminar shear capabilities of the panels manufactured from a prepreg comprising a combination of conductive polyimide particles and fire retardant particles.

TABLE 21

Mechanical data of laminates

| Panels | Prepreg | Properties | Standard | Values |
|---|---|---|---|---|
| 8.4 | 7.1 | Open Hole Compression | ASTM D6484 | 363 ± 4 MPa |
| 8.5 | 7.1 | Apparent ILSS | EN 2563 | 114 ± 1 Mpa |

Example 5: Combination of Crosslinked Thermoplastic Particles and Nitrogen-Phosphorous Based Particles Prepreg Manufacturing Resin compositions 9.1 and 9.2 were prepared according to the formulation shown in Table 22. The amounts are reported in weight by weight (w/w) percentages. Amgard PA1 (from Solvay) was used as nitrogen-and-phosphorous containing fire retardant particles. SEN6065 is a phosphorous-modified epoxy commercially available from Shin-A, with an epoxy equivalent weight E.E.W of 255-285 g/eq and a phosphorous content of 7.3%. The use of the phosphorous-modified epoxy was intended to impart improved fire-retardant property.

TABLE 22

Resin Composition

| Components | Resin code 9.1 | Resin code 9.2 |
|---|---|---|
| Araldite ® PY306 | 23.7 | 20.3 |
| Araldite ® MY0510 | 22.8 | 19.6 |
| SEN6065 | — | 9.4 |
| SUMIKAEXCEL 5003P | 16.0 | 16.0 |
| (f) Amgard PA1 | 8.6 | 6.0 |
| (d) Crosslinked PES-PEES | 5.0 | 6.0 |
| 4,4'DDS | 23.9 | 22.7 |

Each of resin compositions 9.1 and 9.2 was used for impregnating unidirectional carbon fibers IMS65 E23 24K as described in previous examples, resulting in two different particle-containing prepregs, each with a fiber areal weight of about 190 gsm and resin content of 35% w/w. Table 23 provides the composition of the prepregs.

TABLE 23

Prepregs

| Prepreg code | Resin code | Total Interlaminar particles (w/w %) | Polymeric toughening particles | Fire retardant particles | Fibers | Resin Content (%) |
|---|---|---|---|---|---|---|
| Prepreg 9.1 | 9.1 | 13.6 | PES-PEES | Amgard PA1 | IMS65 E23 24K | 35 |
| Prepreg 9.2 | 9.2 | 12 | PES-PEES | Amgard PA1 | IMS65 E23 24K | 35 |

Vertical Burning and Toxicity Test Results

A plurality of Prepregs 9.1 and 9.2 was used to prepare, respectively, composite Panels 10.1 and 10.2 disclosed in Table 24. Panel manufacturing and coupon testing were similar to the procedures described in Example 1. Test results are reported in Table 24. For comparison, the results generated on Control Panel 2.0, which had no interlaminar particles, are also reported in Table 24.

TABLE 24

Comparative flammability and toxicity data

|  | Lay-up | Prepreg | Particle (d) PES-PEES | Particle (f) Amgard PA1 | Phosphorous-modified epoxy | Average flame time (s) | SO2 content (ppm) |
| --- | --- | --- | --- | --- | --- | --- | --- |
| Control Panel 2.0 | [+, 0, −, 90]$_{2s}$ | 1.0 | — | — | — | 17 ± 5 | 100 |
| Panel 10.1 | [+, 0, −, 90]$_{2s}$ | 9.1 | 5% w/w | 8.6% w/w | — | 8 ± 2 | 20 |
| Panel 10.2 | [+, 0, −, 90]$_{2s}$ | 9.2 | 6% w/w | 6% w/w | 9.4 w/w | 5 ± 1 | 20 |

The combination of crosslinked thermoplastic particles and fire retardant particles (Panel 10.1) provided a significant improvement in the flammability performance, as seen by a reduction of the average flame time during the 60-sec Vertical Burning Test and the SO$_2$ content during the Toxicity Test as compared to Control Panel 2.0 containing no particles. Further reduction of the average flame time was obtained with the addition of a phosphorous-modified epoxy (Panel 10.2).

Mechanical Test Results

Panels 10.3-10.6 were manufactured using Prepregs 9.1 and 9.2 for CAI and G$_{Ic}$ tests similar to the procedures described before. The mechanical results are reported in Table 25 in comparison with results for Control Panels 2.7 and 2.11, which did not have any interlaminar particles.

TABLE 25

Comparative mechanical data

|  | Prepreg | Particle (d) PES-PEES | Particle (f) Amgard PA1 | Phosphorous-modified epoxy | CAI_30J (MPa) | G$_{Ic}$ [J/m$^2$] |
| --- | --- | --- | --- | --- | --- | --- |
| Control Panels 2.7, 2.11 | 1.0 | — | — | — | 209 ± 11 | 289 ± 30 |
| Panels 10.3, 10.4 | 9.1 | 5% w/w | 8.6% w/w | — | 249 ± 8 | 403 ± 66 |
| Panels 10.5, 10.6 | 9.2 | 6% w/w | 6% w/w | 9.4 w/w | 254 ± 13 | 415 ± 36 |

Terminology

In the present disclosure, the modifier "approximately" and "about" used in connection with a quantity is inclusive of the stated value and has the meaning dictated by the context, (e.g., includes the degree of error associated with measurement of the particular quantity). For example, a number following "about" can mean the recited number plus or minus 0.1% to 1% of that recited number. The suffix "(s)" as used herein is intended to include both the singular and the plural of the term that it modifies, thereby including one or more of that term (e.g., the metal(s) includes one or more metals). Ranges disclosed herein are inclusive of the endpoints and all intermediate values of the ranges, for example, "1% to 10%" includes 1%, 1.5%, 2%, 2.5%, 3%, 3.5%, etc.

What is claimed is:

1. A composite material comprising:
   at least two layers of reinforcing fibers impregnated with a curable resin;
   an interlaminar region formed between adjacent layers of reinforcing fibers; and
   a combination of polymeric toughening particles (P1) and fire-retardant particles (P2) in the interlaminar region, wherein the weight ratio of P1 to P2 is in the range of from 1:3 to 2:1.

2. The composite material according to claim 1, wherein the interlaminar region formed between adjacent layers of reinforcing fibers has a total weight in the range of 5% to 40% of the total resin content.

3. The composite material according to claim 1, wherein the fire retardant particles are thermally expandable in that the particles expand when exposed to fire or temperature above 200° C.

4. The composite material according to claim 1, wherein the polymeric toughening particles are particles of thermoplastic polymer(s) or crosslinked thermoplastic polymer(s).

5. The composite material according to claim 1, wherein the polymeric toughening particles comprise at least one of: polyamide, aromatic polyimide, crosslinked PES-PEES, and a blend of polyimide and graphite.

6. The composite material according to claim 1, wherein the fire retardant particles comprise at least one phosphorous compound.

7. The composite material according to claim 6, wherein the fire retardant particles comprise nitrogen and phosphorous compounds.

8. The composite material according to claim 6, wherein the fire retardant particles further comprise melamine.

9. The composite material according to claim 1, wherein the fire retardant particles comprise at least one of: ammonium polyphosphate, melamine cyanurate, melamine phosphate, melamine polyphosphate, and melamine poly(metal phosphate).

10. The composite material according to claim 1, wherein the fire retardant particles comprise ammonium polyphosphate encapsulated within a melamine or melamine-containing resin.

11. The composite material according to claim 1, wherein the interlaminar region comprises a curable resin, and the polymeric toughening particles are insoluble in the curable resin at the interlaminar region during curing of the composite material, and remain as discreet particles after curing.

12. The composite material according to claim 1, wherein the interlaminar region comprises a curable resin, and the polymeric toughening particles are soluble in the curable resin at the interlaminar region during curing of the composite material.

13. The composite material according to claim 1, wherein the polymeric toughening particles have a mean particle size (d50) in the range of 5 to 50 microns (μm).

14. The composite material according to claim 11, wherein the curable resin in the interlaminar region has the same composition as that of the curable resin impregnating the reinforcing fibers.

15. The composite material according to claim 1, wherein the curable resin comprises one or more epoxy resin(s).

16. The composite material according to claim 1, wherein the curable resin comprises a combination of at least two multifunctional epoxy resins selected from di-functional, tri-functional and tetra-functional epoxy resins, and a thermoplastic polymer that can form a homogeneous mixture with the epoxy resins.

17. The composite material of claim 16, wherein the thermoplastic polymer is selected from PES, PEES, PES-PEES copolymer, and phenoxy.

18. The composite material according to claim 1, wherein the curable resin comprises a phosphorous-modified epoxy or phenolic resin obtained by reacting a multifunctional epoxy or phenolic resin with an organic phosphinic acid or anhydride thereof.

19. The composite material according to claim 1, wherein the curable resin comprises a derivative of DOPO (or 9,10-Dihydro-9-oxa-10-phosphaphenanthrene 10-oxide) which is prepared by reacting a multifunctional epoxy with DOPO.

* * * * *